May 17, 1938. A. A. BLUCHER 2,117,288
BRAKE ADJUSTER
Filed June 16, 1937 2 Sheets-Sheet 1

Inventor
Amos A. Blucher
By Clarence A. O'Brien
Hyman Berman
Attorneys

May 17, 1938.  A. A. BLUCHER  2,117,288
BRAKE ADJUSTER
Filed June 16, 1937    2 Sheets-Sheet 2
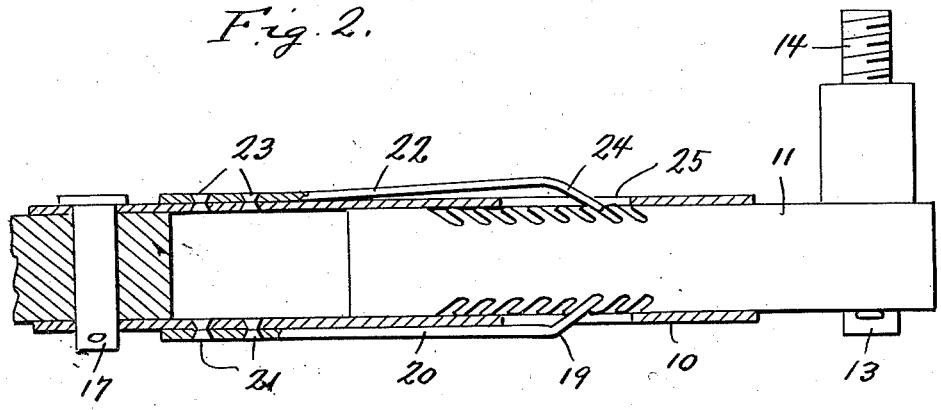
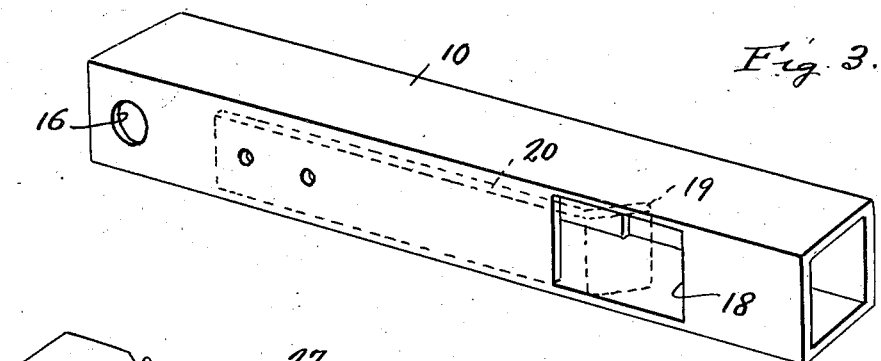
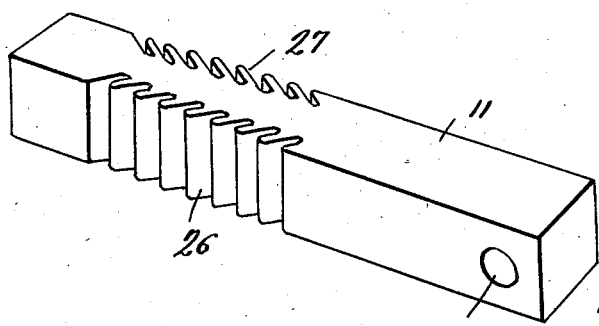
Inventor
Amos A. Blucher
By Clarence A. O'Brien
Hyman Berman
Attorneys Patented May 17, 1938

2,117,288

UNITED STATES PATENT OFFICE 2,117,288

BRAKE ADJUSTER

Amos A. Blucher, Owings Mills, Md., assignor of one-half to Edward L. Blair, Westminster, Md.

Application June 16, 1937, Serial No. 148,594

2 Claims. (Cl. 188—79.5)

This invention appertains to new and useful improvements in means for adjusting the brake shoes of motor vehicle brakes.

The principal object of the present invention is to provide a brake adjuster wherein the adjustment takes place automatically as the brake bands wear.

Another important object of the invention is to provide a self-adjusting brake shoe device which will be automatic, positive acting and not susceptible to the ready development of defects.

In the drawings:—

Figure 2 is a fragmentary enlarged sectional view on the line 2—2 of Figure 1.

Figure 3 is a perspective view of the hollow element of one of the devices.

Figure 4 is a perspective of the solid element of one of the adjusting devices.

Figure 1:
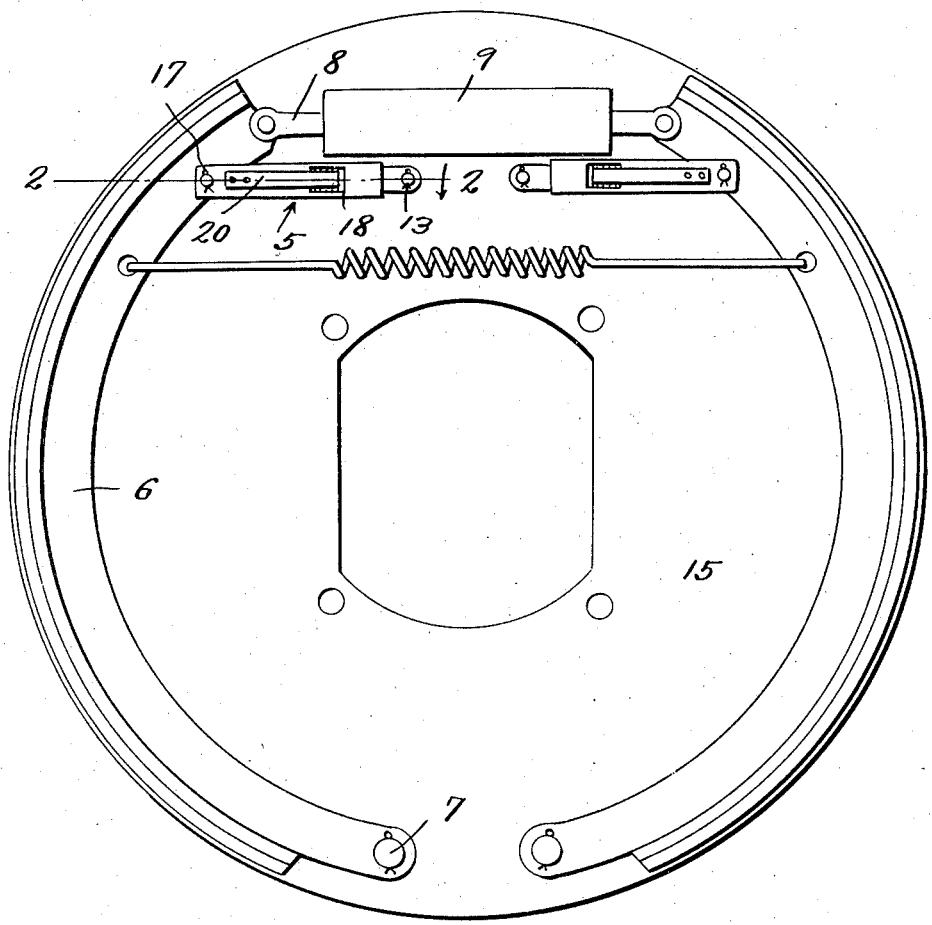
Figure 1 represents an inside elevational view of the brake structure showing the self-adjusting devices.

Referring to the drawings wherein like numerals designate like parts, it can be seen that one of these devices generally referred to by numeral 5 is employed for each of the shoes 6. It can also be seen in Figure 1 that numeral 7 denotes the pivotal end of each of the shoes 6 while the remaining ends of these shoes are connected by pitmans 8 to the wheel cylinder 9 of the usual hydraulic brake system.

Each of the adjusting devices 5 consists of an elongated hollow shell 10 and a complementary elongated oblong block 11. The block 11 at one end is provided with the transverse bore 12 for accommodating a pivot pin 13 which is threaded at one end as at 14 for disposition into the wall structure 15 of the brake housing.

The shell 10 is likewise provided with openings 16 through which the pivot pin 17 is disposed for pivotally connecting the shell 10 to the corresponding shoe 6.

The shell 10 is provided with a rectangular-shaped opening 18 in one side thereof through which the diverged end portion 19 of the elongated strip spring 20 can project, and this strip spring 20 being anchored as at 21 to the side of the shell 10. It is desirable that a second spring 22 be provided at the opposite side of the shell 10 and anchored in place by rivets 23. The free end of this spring 22 is provided with a diverged end portion 24 adapted to project through the opening 25 to engage the block 11.

As is shown in Figures 2 and 4, the portion of the block 11 which projects into the shell 10 is provided with a row of teeth 26 at one side and a row of teeth 27 at its opposite side, the teeth 26—27 being in oblique relation with respect to the longitudinal axis of the block 11 and in longitudinal offset relation with respect to each other. The springs 22 and their diverged end portions 19—24 are of the same length, so that when the diverged end portion 19 is fully engaged with one of the teeth 26, the diverged end portion 24 is only overlapping a tooth 27 half way.

Thus it can be seen, that as the brake lining of the shoe 6 wears, each application of the shoe will move the shell 10 so that the diverged portions 19—24 will move outwardly under their corresponding teeth and when sufficient wear has taken place the diverged end portion 24 will ride over the end of its tooth and ride against the next succeeding tooth, while the diverged end portion 19 will utilize about half the length of its complementary tooth.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:—

1. In combination with a brake shoe, an adjusting device, said adjusting device consisting of a shell, a member slidable in the shell, said shell and member being one anchored to the shoe and the other stationarily secured, means for operating the shoe, and pawl and ratchet means between the shell and the slidable element, said pawl and ratchet means consisting in the provision of oblique teeth on the slidable member at opposite sides thereof, strip springs on the said shell, said shell being provided with openings in which the free ends of the springs can project and engage the teeth.

2. In combination with a brake shoe, an adjusting device, said adjusting device consisting of a shell, a member slidable in the shell, said shell and member being one anchored to the shoe and the other stationarily secured, means for operating the shoe, and pawl and ratchet means between the shell and the slidable element, said pawl and ratchet means consisting in the provision of oblique teeth on the slidable member at a pair of opposite sides thereof, strip springs on the said shell, said shell being provided with openings in which the free ends of the springs can project and engage the teeth, said teeth being offset longitudinally with respect to each other on the said slidable member.

AMOS A. BLUCHER.